United States Patent Office 3,376,104
Patented Apr. 2, 1968

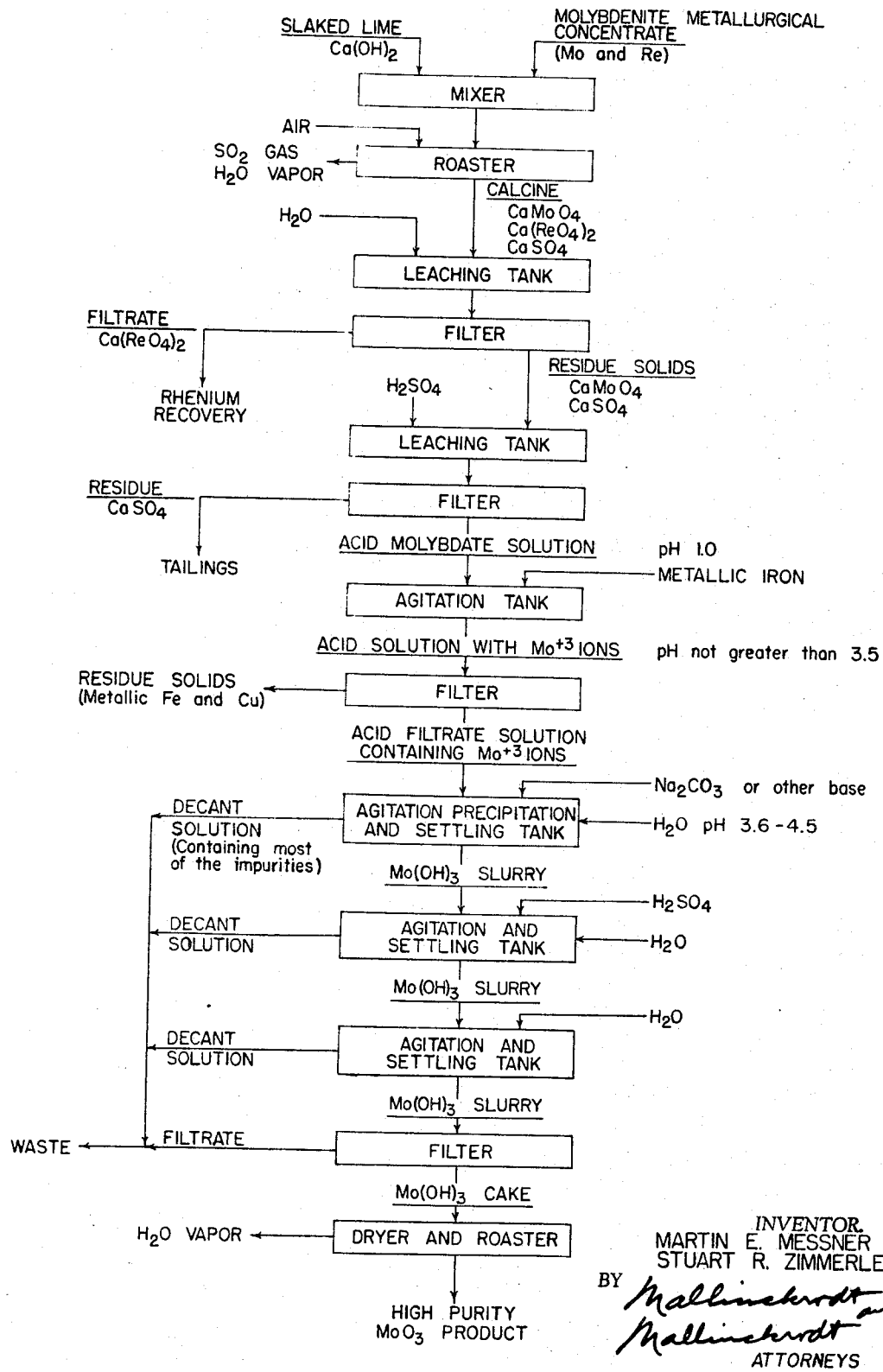

3,376,104
EXTRACTION OF RHENIUM AND PRODUCTION OF MOLYBDIC OXIDE FROM SULFIDE ORE MATERIALS
Martin E. Messner and Stuart R. Zimmerley, Salt Lake City, Utah, assignors to Kennecott Copper Corporation, New York, N.Y., a corporation of New York
Filed July 22, 1964, Ser. No. 384,424
7 Claims. (Cl. 23—15)

ABSTRACT OF THE DISCLOSURE

A process for extracting rhenium and molybdenum values and for producing molybdic oxide from sulfide ore materials, such as molybdenite concentrates, containing both rhenium and molybdenum values. The ore material is mixed with a calcium reagent of the nature of calcium hydroxide or calcium oxide and is then calcined at a temperature within the range of from about 566° to 732° C. to produce calcium perrhenate and calcium molybdate. Since the former is water-soluble and the latter water-insoluble, a water leach places the calcium perrhenate in solution free of calcium molybdate. Separation of the liquid and solids yields a solution that is treated for the recovery of rhenium values and residue solids that are treated for the recovery of molybdenum values, desirably by leaching with a mineral acid to produce an acid molybdate solution, which is further treated for the production of molybdic oxide by reducing the dissolved molybdenum to the trivalent state, precipitating molybdenum hydroxide therefrom, and converting the molybdenum hydroxide to molybdic oxide.

---

This invention relates to the recovery of both rhenium and molybdenum values from ore materials of sulfide character which contain same and is particularly concerned with both the extraction of rhenium and the production of high purity molybdic oxide from molybdenite metallurgical concentrates.

Various sulfide ore materials, such as some copper sulfide ores, some molybdenite concentrates, mill tailings, and other products resulting from ore milling practices, contain rhenium values and molybdenum values in sufficient quantities to make recovery thereof practical.

It is conventional practice to subject molybdenite concentrates, derived as a by-product of the milling of copper sulfide ores, to roasting for the production of commerical molybdic oxide. When such concentrates also contain significant quantities of rhenium values, e.g. in the range of from 0.01% to 0.20%, as they often do, it is common practice to treat flue dusts and effluent gases for the recovery of rhenium volatilized by the roasting heat. Although a high grade molybdic oxide is produced in this manner when the grade of the molybdenite concentrates is high, recovery of the rhenium content of the concentrates is limited, as a practical matter, by the amount fumed off. This is true even when the most advanced techniques are employed, such as the process disclosed by the Zimmerley et al. U.S. Patent No. 2,809,092 issued Oct. 8, 1957, and entitled "Extraction of Rhenium Incidental to Manufacture of Molybdenum Oxide." That portion of the rhenium not volatilized by the roasting heat remains in the molybdic oxide product.

There are some molybdenite concentrates exceptionally high in rhenium content which are not of sufficiently high grade to yield commercial molybdic oxide by the roasting procedure referred to above. Where sale of these concentrates is possible at all, there is imposed a high penalty based upon the percentage of gangue materials present.

A principal purpose in the making of the present invention was to provide a process whereby a high grade molybdic oxide product can be produced from molybdenite concentrates, regardless of grade, and a high percentage of the rhenium content thereof can be recovered at the same time.

Another purpose was to provide such a process capable of being effectively and economically carried out by equipment and techniques usual to the metallurgical arts.

In accordance with the invention, a rhenium-containing molybdenite concentrate, or other sulfide ore material to which the process is applicable is subjected to calcination in the presence of a calcium reagent for inhibiting volatilization of rhenium, to produce, principally, calcium perrhenate, $Ca(ReO_4)_2$, calcium molybdate, $CaMoO_4$, and calcium sulfate, $CaSO_4$. Reactions taking place are believed to be in accordance with the following equations:

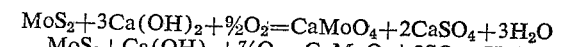
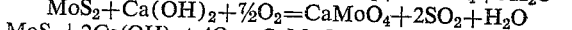
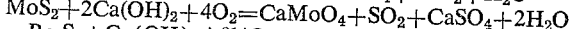
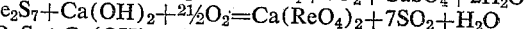
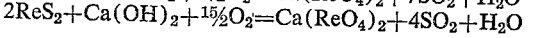

$$MoS_2 + 3Ca(OH)_2 + 9\tfrac{1}{2}O_2 = CaMoO_4 + 2CaSO_4 + 3H_2O$$
$$MoS_2 + Ca(OH)_2 + 7\tfrac{1}{2}O_2 = CaMoO_4 + 2SO_2 + H_2O$$
$$MoS_2 + 2Ca(OH)_2 + 4O_2 = CaMoO_4 + SO_2 + CaSO_4 + 2H_2O$$
$$Re_2S_7 + Ca(OH)_2 + 2\tfrac{1}{2}O_2 = Ca(ReO_4)_2 + 7SO_2 + H_2O$$
$$2ReS_2 + Ca(OH)_2 + 1\tfrac{5}{2}O_2 = Ca(ReO_4)_2 + 4SO_2 + H_2O$$

There are various calcium compounds that will inhibit volatilization of rhenium under these circumstances, see pp. 58 and 59 of K. B. Lebedev's "The Chemistry of Rhenium" published by Butterworths in 1962. Nevertheless, we have found that calcium hydroxide, $Ca(OH)_2$, preferably in the form of ordinary slaked lime, is not only very effective in inhibiting volatilization of rhenium, but, in some presently unknown way, increases water solubility of the rhenium thereby retained in the resulting calcine and yields greater extractions of both rhenium and molybdenum. Moreover, we have found that the calcium hydroxide is almost instantly converted to calcium sulfate by the calcining heat, and, contrary to the teaching of the above publication, does not thereby increase volatilization of rhenium, but, rather, does actually serve the desired purpose of very effectively inhibiting volatilization.

As a second step in the process of the invention, the calcium perrhenate is separated from the calcium molybdate by selective leaching with water. The latter compound remains relatively insoluble throughout an aqueous leaching procedure, while the calcium perrhenate readily goes into solution.

Separation of the resulting leach solution from the insoluble residue by filtration or other suitable technique, completes the desired separation of the rhenium values from the molybdenum values in the feed material and yields a rhenium-bearing solution (containing only from 0.005 to 0.05 gm./l. molybdenum) susceptible of treatment in known manner, for example by the process disclosed in U.S. Patent No. 2,945,743 granted to S. R. Zimmerley and John D. Prater July 19, 1960 entitled "Process for Purifying Impure Rhenium-Bearing Solutions by Ion-Exchange," for recovery of the rhenium values in commercial form, and also yields calcium molybdate residue solids susceptible of treatment for the production of high purity molybdic oxide.

We have found that the calcium molybdate residue can be leached with a mineral acid, preferably sulfuric acid, to yield a relatively uncontaminated acid molybdate solution, and that such solution can be treated in accordance with the disclosure of our copending application for U.S. patent, Ser. No. 329,095, filed Dec. 9, 1963, entitled, "Process for Producing Molybdic Oxide from Molybdate Solutions," to produce a molybdic oxide product having a degree of purity well within commercial standards. Accordingly, these procedures constitute steps in the overall process of this invention.

Numerous tests in the laboratory have shown that as much as 85% of the rhenium originally present in the metallurgical material reports in the solution which results from the aqueous leach and that the ratio of rhenium to molybdenum in such solution usually exceeds 1 to 1, e.g. 5 or 10 to 1, and has, on occasion, reached 20 to 1. Volatilization losses of rhenium can be kept at less than about 4%. Extraction of molybdenum from the calcium molybdate residue is often in the order of 98% and has in all work done to date been in excess of 90%. The final molybdic oxide product has a purity, i.e. a $MoO_3$ content, of at least 90%.

Although recovery of the relatively small amount of rhenium reporting in the acid molybdate solution (approximately 10% of that present in the sulfide ore material) is not presently contemplated, suitable techniques may be utilized for the purpose where economically feasible.

The use of metallic iron as a reducing agent in the treatment of the acid molybdate solution enables the recovery of contaminating copper as metallic copper, e.g. by conventional cementation practices if desired.

The process is described in detail and is illustrated in the accompanying drawing with respect to specific procedures presently regarded as the best mode of carrying out the invention in commercial practice. From this detailed description, other more specific objects and features of the invention will become apparent.

The single figure of the drawing is a flowsheet illustrative of the process applied to molybdenite concentrates to extract rhenium therefrom and to produce a molybdic oxide product of high purity.

As indicated in the flowsheet, the molybdenite concentrates are preferably first introduced into a suitable mixer along with a quantity of slaked lime somewhat in excess of the stoichiometric, usually about twice the weight of the concentrates, and subjected to thorough mixing, whereupon the mixture is charged into a roaster and subjected to calcination for a period of about two hours at a temperature of from about 566° to 732° C., the optimum being 621° C. The reactions taking place during the calcination are decidedly exothermic. Thus, little external heat is necessary.

It is desirable that the mixture be agitated in the roaster either continuously or at intervals not greater than fifteen minutes during calcination.

The calcination product, containing both water-soluble calcium perrhenate and water-insoluble calcium molybdate, is placed in a leaching tank and subjected to a water leach at ambient temperature and preferably with some agitation for a period of from one-half hour to twenty-four hours, depending upon circumstances. Good extractions have been obtained in the laboratory in the minimum time indicated, but some advantage is usually obtained by a longer period.

Separation of the rhenium-bearing solution from the molybdenum-bearing residue is conveniently carried out by filtration, the filtrate being sent to further processing for the recovery of the contained rhenium values, as previously indicated, and the caked residue being placed in a leaching tank for acid-leaching of the contained molybdenum values.

Although any mineral acid can be employed for leaching, sulfuric acid is preferred, primarily because of its ready availability and low cost. Essentially all the molybdenum can be placed in solution by using from 1.75 to 2.4 times the stoichiometric amount of reagent grade acid of 1.83 specific gravity and leaching at ambient temperature.

The resulting slurry is filtered, and the filtrate containing the molybdenum values as an acid molybdate solution is passed to a tank for treatment with a reducing agent, preferably metallic iron, whereby the molybdenum ions in solution are reduced to a valence of +3, i.e. the trivalent state. The quantity of the iron reductant should be about equal, by weight, that of the molybdenum being reduced, and, as set forth in our afore-referred-to copending application Ser. No. 329,095, the pH of the acid molybdate solution should in any event be low enough so the pH of the reduced solution is not greater than 3.5.

The leaching step dissolves much of the copper and iron present in the caked residue, as well as whatever rhenium escaped the initial water leach. The reducing treatment oxidizes the remaining iron to either the +2 or the +3 valence state, so that it goes into solution; it also substantially completely reduces the copper, so that it precipitates in the metallic form along with any unconsumed metallic iron reductant.

The pH of the acid molybdate solution should be well below 3.5 prior to the reduction step, inasmuch as the pH increases during the latter and a pH greater than 3.5 should be avoided to prevent any precipitation of molybdenum values at this stage of the process. A pH of 1.0 is usual at the beginning of the reduction step. Reduction takes place very rapidly, normally being complete within a period of about fifteen minutes.

The calcium sulfate residue from the filtration step is generally regarded as waste.

The reduced material is filtered to separate the metallic copper, excess metallic iron, and such small quantity of metallic and/or oxides of molybdenum as might be present, from the acid solution as residue solids, the filtrate solution being passed to a precipitation tank for treatment with a base material, e.g. sodium carbonate, to precipitate molybdenum as the trihydroxide and to redissolve any precipitated iron salts. Washing, filtering, drying, and roasting of the trihydroxide precipitate to produce a molybdic oxide ($MoO_3$) product of high purity, is all as set forth in our afore-referred-to copending application Ser. No. 329,095. The residue can be treated for copper recovery by cementation, but is advantageously sent to the smelter.

As the pH of the acid filtrate solution is increased to a pH of 4.5, as a maximum, during the sodium carbonate addition, the molybdenum trihydroxide begins to form at a pH of 3.6. Most of the iron salts remain in solution below a pH of 6.5, so contamination of the precipitate is minimized.

By adding a slight amount of dilute acid to the solution, enough to lower the pH from the higher value to 3.7 or even 3.5, precipitated iron salts are dissolved substantially without dissolving any of the molybdenum hydroxide. Below a pH of 3.5, the molybdenum will begin to dissolve.

After washing of the molybdenum hydroxide residue with water, roasting is carried out at a temperature preferably within the range of 400° to 550° C. and for a time interval in the range of fifteen minutes to one hour. This oxidizes the molybdenum to the +6 valence state and forms molybdic trioxide of high purity as compared with the usual commercial standard. Analyses of the final product will vary from about 90% to about 95% molybdic trioxide, which represents from about 60% to about 63% molybdenum. Impurity concentrations for copper, sulfur, silica, phosphorous, arsenic, and alumina range from only several hundredths of one percent to only several tenths of one percent. Iron concentration will depend upon the number of washing and decantation steps employed in any given instance, but will ordinarily not be over 3.0% at a maximum.

Following are typical examples from the laboratory:

Example I

Two hundred grams of molybdenite concentrates having the following analysis:

| | Percent |
|---|---|
| Molybdenum disulfide | 66.80 |
| (Molybdenum) | 40.05 |
| Rhenium | 0.156 |
| Copper | 2.45 | were well mixed with four hundred grams of slaked lime.

The concentrates and calcium hydroxide were placed in a rectangular roasting dish to a depth of one inch. The dish was placed in an electric muffle which had been pre-heated to 621° C. Twenty minutes after entry, the roasting material bed temperature varied from 565° C. on the surface to 260° C. at the bottom. At five minute intervals rabbling was performed on the mixture for the remainder of the roasting period. The maximum bed temperature, 704° C., was reached after one hour of roasting. After one and one-half hours the bed temperature had reduced to 650° C. and after one and three-quarter hours to 620° C. The roasting dish was removed from the muffle at two hours and permitted to cool to room temperature. Analysis of the roasted material showed only a 3.7 percent rhenium loss and a 1.6 percent molybdenum loss through volatilization.

A measured portion of the cooled product was transferred to a beaker and mixed with sufficient water to form a 37.5 percent solids slurry. This material was agitated for twenty hours at ambient temperature, then filtered, and the resulting residue solids were washed seven times with water.

The filtrate and washings were combined and analyzed. This solution contained 83.90 percent of the original rhenium and 0.017 percent of the original molybdenum.

The moist filter cake from the initial aqueous leach was leached for one-half hour at ambient temperature with water at 37.5 percent solids. Following filtration the residue was again washed seven times with water. The solution resulting from combining filtrate and wash water contained 2.95 percent of the original rhenium and 0.017 percent of the original molybdenum.

The moist residue was well mixed with 0.75 normal sulfuric acid to allow 2.25 grams of sulfuric acid per gram of molybdenum contained in the residue. Leaching was conducted at ambient temperature for twenty hours with agitation. The slurry was filtered, the resulting residue washed with water, and the solution resulting from combining filtrate and wash water analyzed. The results are as follows:

|  | Molybdenum, gram/liter | Rhenium, gram/liter | Copper, gram/liter |
| --- | --- | --- | --- |
| First water leach solution | 0.006 | 0.114 |  |
| Second water leach solution | 0.006 | 0.004 |  |
| Sulfuric acid leach solution | 7.38 | 0.003 | 0.26 |

A summary of the extractions of rhenium, molybdenum, and copper resulting from the two aqueous leaches and the sulfuric acid leaches is presented in the following table:

|  | Extraction, percent of original | | |
| --- | --- | --- | --- |
|  | Molybdenum | Rhenium | Copper |
| First water leach solution | 0.017 | 83.9 | 2.3 |
| Second water leach solution | 0.017 | 2.95 | 0.7 |
| Sulfuric acid leach solution | 98.37 | 10.03 | 61.7 |

To the sulfuric acid leach solution was added an amount of finely divided metallic iron equal in weight to 135 percent of the weight of molybdenum contained in such solution. Following fifteen minutes of gentle agitation, the precipitated copper and excess iron were removed by filtration. The filtrate, at a pH of 3.0, had changed from deep green to brown-black in color.

To this filtrate was added sodium $Na_2CO_3$ solution until a pH of 5.5 was reached. A dense molybdenum hydroxide precipitate formed and was allowed to settle. Seventy-five percent of the supernatant liquid was removed by decanting and an equal amount of water again added with enough sulfuric acid to lower the pH to 5.0. The precipitate was again allowed to settle and the liquor decanted, this procedure being repeated twice more without further acid addition.

The final pulp was filtered and washed three times with water, after which is was roasted at 550° C. for fifteen minutes. The final molybdic trioxide product contained 98.34 percent of the original molybdenum in the concentrate. The anlysis of the final product was as follows:

|  | Percent |
| --- | --- |
| Molybdenum trioxide | 94.3 |
| (Molybdenum) | 62.9 |
| Iron | 2.12 |
| Copper | 0.14 |
| Sulfur | 0.02 |
| Phosphorus | 0.16 |

Example II

Two hundred grams of molybdenite concentrates analyzing as follows:

|  | Percent |
| --- | --- |
| Molybdenum disulfide | 84.30 |
| (Molybdenum) | 50.58 |
| Rhenium | 0.06 |
| Copper | 0.91 | were well mixed with four hundred grams of slaked lime.

The mixture was placed in a roasting dish, which was put into a muffle preheated to 621° C. During a two hour roasting period, the mixture was rabbled at five minute intervals. The temperature of the bed of material reached 482° C. after one-half hour and varied from 482° to 704° C. during the final one and one-half hours of roasting.

After removal of the calcined product from the muffle and cooling to ambient temperature, a portion was transferred to a beaker for leaching with water at 10 percent solids. The slurry was agitated for twenty hours at ambient temperature, then filtered, and the residue solids washed seven times with water. The combined filtrate and wash solutions were analyzed and found to contain 0.009 gram per liter of rhenium and 0.054 gram per liter of molybdenum.

A second water leach at 20.0 percent solids was made on the moist filter cake from the initial leach, using agitation for five minutes at ambient temperature. The material was filtered and washed twice with water. The combined solution contained 0.0004 gram per liter of rhenium and 0.024 gram per liter of molybdenum. Extractions of both rhenium and molybdenum during the two leaching operations were as follows:

|  | Extraction, percent of original | |
| --- | --- | --- |
|  | Molybdenum | Rhenium |
| First water leach solution | 0.54 | 77.88 |
| Second water leach solution | 0.24 | 1.73 |
| Combined water leach solutions | 0.78 | 79.61 |

An acid leach was carried out on the water leach residue at 7 percent solids with an acid solution which contained 2.93 grams of sulfuric acid per gram of molybdenum in the residue. After twenty hours of leaching at ambient temperature, the slurry was filtered. Following several water washes, the residue was dried and both the residue and the filtrate and wash solutions were analyzed as follows:

|  | Extraction, percent of original | |
| --- | --- | --- |
|  | Molybdenum | Rhenium |
| Acid leach solution, including water washings | 96.4 | 14.34 |
| Acid leach residue | 1.4 | 3.26 |

The combined leach solution and washings, i.e. acid molybdate solution, was treated with metallic iron at a ratio of 1.5 grams of iron per gram of molybdenum in solution. The excess iron and precipitated copper were removed by filtration, and the filtrate was treated with sodium carbonate solution to a pH of 4.5. The precipitated molybdenum hydroxide was allowed to settle, the supernatant solution was decanted, and the remaining residue was filtered. The filter cake was dried at 100° C. and roasted at 550° C. to yield a final molybdic oxide product containing 97.9 of the original molybdenum in the concentrate and analyzing as follows:

| | Percent |
|---|---|
| Molybdenum trioxide | 91.7 |
| (Molybdenum) | 55.0 |
| Iron | 3.48 |
| Copper | 0.03 |
| Sulfur | 0.41 |
| Phosphorus | 0.10 |

The solution loss of molybdenum during the precipitation operation was negligible; the chief impurity in the final product was iron. Single stage decantation accounts for the relatively high iron content in the final product. It could have been minimized by additional decantation or washing operations.

Example III

This test was carried out through the steps of rhenium extraction and the production of the acid molybdate solution. Three parts by weight of slaked lime and one part molybdenite concentrates analyzing:

| | Percent |
|---|---|
| Molybdenum disulfide | 76.7 |
| (Molybdenum) | 46.0 |
| Rhenium | 0.154 |
| Copper | 2.54 |
| Iron | 4.49 | were well mixed and introduced into a furnace which had been preheated to 400° C.

Following fifteen minutes of preheating, the furnace temperature was increased to 600° C. Spontaneous visible burning or calcination of the slaked lime-concentrate mixture began and continued for one hour, during which time the material was intermittently agitated. Overall bed temperatures reached a maximum of 700° C., although the highest burning surface temperature exceeded that temperature somewhat. A two percent weight loss accompanied the roasting.

The cooled, roasted material was water leached for one and one-half hours with agitation, followed by fourteen hours of leaching with no agitation. This was done at ambient temperature and at thirty percent solids. The solution was separated by filtration. The filter cake was again leached with water at thirty percent solids for an hour, filtered, and the filter cake dried. It showed a 6.75 percent weight gain through the water leaching. The residue and solutions were analyzed.

The dried residue solids were then leached with sulfuric acid at twenty-five percent solids with agitation for four hours at 80° C. Approximately two lbs. of $H_2SO_4$ per lb. of molybdenum in the residue were consumed. Following filtration, the residue was washed with water and dried. A substantial weight gain, fifty-five percent on the original basis, resulted from the acid leach. Results were as follows:

| | Analysis, Percent of Original Values Contained in Concentrate | | | |
|---|---|---|---|---|
| | Re | Mo | Cu | Fe |
| Volatilized during roasting | 4.0 | 2.8 | | |
| Water leach solutions | 81.8 | Nil | | |
| Water leach residue | 14.2 | 97.2 | 100.0 | 100.0 |
| Acid molybdate solution | 10.8 | 92.7 | 87.5 | 43.2 |
| Acid leach residue | 3.4 | 4.5 | 12.5 | 56.8 |

Example IV

In this laboratory test, carried out only through the extraction of the rhenium and the production of an acid molybdate solution, three hundred grams of commercial burned limestone (quicklime, essentially all CaO) were mixed with two hundred grams of molybdenite concentrate and placed in a preheated roaster at 620° C. The Analysis of the concentrate was as follows:

| | Percent |
|---|---|
| Molybdenum disulfide | 70.5 |
| (Molybdenum) | 42.3 |
| Rhenium | 0.129 |

The material was roasted for one and one-half hours, without rabbling, during which time some burning was evident accompanied by noticeable sulfur dioxide gas evolution. Continuous bed temperature measurement indicated a maximum bed temperature of about 675° C., this temperature persisting from fifteen minutes after the beginning of the roast to forty-five minutes after such beginning. Following roasting and cooling, the calcine was leached with water at ambient temperature and 30 percent solids for twelve hours. After filtering of the leach slurry, the rhenium-bearing filtrate and the molybdenum-bearing residue solids were analyzed. Rhenium and molybdenum distribution was as follows:

| | Extraction, percent of original | |
|---|---|---|
| | Molybdenum | Rhenium |
| Filtrate (Water leach solution) | Nil | 71.5 |
| Residue Solids (Water leach residue) | 97.8 | 25.2 |
| Volatized during roasting | 2.2 | 3.3 |

The residue solids were leached at 20 percent solids and at ambient temperature for sixteen hours, using an acid solution containing 2.46 lbs. of $H_2SO_4$ per lb. of molybdenum contained in the residue solids being leached. The acid solution had an initial concentration of 70 grams per liter.

The resulting acid leach slurry was filtered, yielding a dark green molybdenum-bearing solution and a white residue, principally calcium sulfate. Analysis of these products showed the following distribution of molybdenum:

| | Extraction, percent of original molybdenum |
|---|---|
| Acid molybdate solution | 96.9 |
| Acid leach residue | 0.9 |

As has been previously indicated, calcium compounds will inhibit volatilization of rhenium. Others of the alkaline earth metals are also more or less effective for the purpose. Thus, when a molybdenite concentrate was calcined with barium hydroxide, only 25% of the rhenium was volatilized. On the other hand, when strontium hydroxide was used, 70% of the rhenium was volatilized.

Subsequent steps in the process are affected by the type of material used to inhibit rhenium volatilization. Although barium molybdate, like calcium molybdate, is relatively insoluble in water, and separation of the rhenium values from the molybdenum values can be effected with reasonable success by water leaching, the final acid leaching step has been found to solubilize a considerably less amount of the barium molybdate than it would have calcium molybdate under the same circumstances.

Strontium molybdate is moderately soluble in water, so that separation of the molybdate from strontium perrhenate by water leaching is not particularly satisfactory. In a laboratory test, three percent of the molybdenum in calcined molybdenite concentrates was placed in solution along with fifty percent of the rhenium.

Although magnesium can be used to inhibit volatilization of rhenium during the roasting procedure, magnesium molybdate is relatively water soluble and practical rhenium-molybdenum separation by water leaching cannot normally be achieved. However, there are other possible procedures for separating the perrhenates and molybdates, based on their respectively different physical characteristics; for example, ion exchange and liquid-liquid separation techniques may be employed.

Whereas there are here specifically set forth certain preferred procedures which are presently regarded as the best mode of carrying out the invention, it should be

We claim:

1. A process for extracting rhenium and producing molybdic oxide from a sulfide ore material containing both rhenium and molybdenum values, comprising mixing the ore material with a calcium reagent effective to inhibit the volatilization of rhenium at normal calcining temperatures, said calcium reagent being selected from the group consisting of calcium hydroxide and calcium oxide; calcining the mixture at a temperature within the range of from about 566° to 732° C. to produce the calcium perrhenate, which is water-soluble, and calcium molybdate, which is water-insoluble; leaching the calcine with water to selectively place the calcium perrhenate in solution; separating the resulting rhenium-bearing solution from the residue solids; treating the said solution for the recovery of the contained rhenium values; leaching said residue solids with a mineral acid to produce an acid molybdate solution whose pH is below 3.5; separating the acid molybdate solution from the residue solids; reducing the molybdenum in said acid solution to the trivalent state; precipitating and separating molybdenum hydroxide from the resulting solution; and converting the molybdenum hydroxide to molybdic oxide.

2. The process of claim 1, wherein the molybdenum in the acid solution is reduced to the trivalent state by the introduction of metallic iron into the solution, whereby any copper impurity is precipitated.

3. The process of claim 1, wherein molybdenum hydroxide is precipitated by introducing into the solution a basic material; and wherein the molybdenum hydroxide is converted to molybdic oxide by drying and roasting.

4. A process for extracting rhenium and molybdenum values from a sulfide ore material containing same, comprising mixing said ore material with a calcium reagent effective to inhibit the volatilization of rhenium at normal calcining temperatures, said calcium reagent being selected from the group consisting of calcium hydroxide and calcium oxide; calcining the mixture at a temperature within the range of from about 566° to 732° C. to produce calcium perrhenate, which is water-soluble, and calcium molybdate, which is water-insoluble; leaching the calcine with water to selectively place the calcium perrhenate in solution; separating the resulting rhenium-bearing solution from the residue solids; treating the said solution for the recovery of the contained rhenium values; and treating the said solids for the recovery of the contained molybdenum values.

5. A process for extracting rhenium and producing a molybdenum product from a sulfide ore material containing both rhenium and molybdenum values, comprising mixing the ore material with a calcium reagent effective to inhibit the volatilization of rhenium at normal calcining temperatures, said calcium reagent being selected from the group consisting of calcium hydroxide and calcium oxide; calcining the mixture at a temperature within the range of from about 566° to 732° C. to produce calcium perrhenate, which is water-soluble, and calcium molybdate, which is water-insoluble, leaching the calcine with water to selectively place the calcium perrhenate in solution; separating the resulting rhenium-bearing solution from the residue solids; treating the said solution for the recovery of the contained rhenium values; leaching said residue solids with a mineral acid to produce an acid molybdate solution whose pH is below 3.5; separating the acid molybdate solution from the residue solids; reducing the molybdenum in said acid solution to the trivalent state; and precipitating and separating molybdenum hydroxide from the resulting solution.

6. The process of claim 5, wherein the calcium reagent is calcium hydroxide.

7. The process of claim 5, wherein the molybdenum in the acid solution is reduced to the trivalent state by the introduction of metallic iron into the solution, whereby any copper impurity is precipitated.

References Cited

UNITED STATES PATENTS

| | | | |
|---|---|---|---|
| 1,873,475 | 8/1932 | Pokorny | 23—18 |
| 2,017,557 | 10/1935 | Winkler et al. | 23—23 |
| 2,965,447 | 12/1960 | Zimmerley et al. | 223—17 |
| 2,967,757 | 1/1961 | Zimmerley et al. | 23—19 |

OSCAR R. VERTIZ, *Primary Examiner.*

H. T. CARTER, *Assistant Examiner.*